US012762763B2

(12) United States Patent
Fletcher

(10) Patent No.: US 12,762,763 B2
(45) Date of Patent: Oct. 13, 2026

(54) METHOD FOR GENERATING A DIGITAL FABRIC TILE

(71) Applicant: Bandicoot Imaging Sciences Pty Ltd, Kalang Heights (AU)

(72) Inventor: Peter Alleine Fletcher, Kalang Heights (AU)

(73) Assignee: Bandicoot Imaging Sciences Pty Ltd, Kalang Heights (AU)

( * ) Notice: Subject to any disclaimer, the term of this patent is extended or adjusted under 35 U.S.C. 154(b) by 111 days.

(21) Appl. No.: 18/870,070

(22) PCT Filed: Jun. 6, 2023

(86) PCT No.: PCT/AU2023/050489

§ 371 (c)(1),
(2) Date: Nov. 27, 2024

(87) PCT Pub. No.: WO2023/235917

PCT Pub. Date: Dec. 14, 2023

(65) Prior Publication Data

US 2025/0336107 A1 Oct. 30, 2025

(30) Foreign Application Priority Data

Jun. 6, 2022 (AU) ................................ 2022901540

(51) Int. Cl.
*G06T 11/10* (2026.01)
*G06T 7/42* (2017.01)

(52) U.S. Cl.
CPC ................ *G06T 11/10* (2026.01); *G06T 7/42* (2017.01); *G06T 2207/30124* (2013.01)

(58) Field of Classification Search
CPC .. G06T 11/10; G06T 7/42; G06T 2207/30124
See application file for complete search history.

(56) References Cited

U.S. PATENT DOCUMENTS

2011/0148871 A1* 6/2011 Kim ........................ G06T 15/50
345/582
2022/0292810 A1* 9/2022 Chao ....................... G06F 30/27

* cited by examiner

*Primary Examiner* — Jitesh Patel
(74) *Attorney, Agent, or Firm* — Christensen, Fonder, Dardi & Busse PLLC; John P. Fonder

(57) ABSTRACT

A method for generating a digital fabric tile. A step of the method includes, in a processor, determining a fundamental spatial frequency in an image of the fabric in each of two orthogonal directions. A step of the method includes, in the processor, determining a plurality of weave vectors for the image of the fabric. A step of the method includes, forming the tile using the fundamental spatial frequency in each of the two orthogonal directions and the plurality of weave vectors.

21 Claims, 3 Drawing Sheets

METHOD FOR GENERATING A DIGITAL FABRIC TILE

PRIORITY CLAIM

The present application is a National Phase entry of PCT Application No. PCT/AU2023/050489, filed Jun. 6, 2023, which claims the benefit of Australian Patent Application No. 2022901540, filed Jun. 6, 2022, which are incorporated herein by reference in their entirety.

TECHNICAL FIELD

The disclosure herein generally relates to digital representations of fabric and particularly but not exclusively to a method for generating a digital fabric tile.

BACKGROUND

The manufacture of garments increasingly includes the use of clothing design software. Some clothing design software may use fabric information (a "digital fabric") to produce a visualisation of a selected fabric fashioned into a garment. Visualisation of a garments may assist a manufacturer to visualise the structure, patterning and texture of the garment prior to manufacture, which may reduce or eliminate the labour required to cut and sew cloth pre-production samples, and save considerable time. Textile manufacturers, garment designers and the fashion industry may also make use of digital fabrics, and may electronically and conveniently exchange fabric information in the form of digital swatches, which are the digital analogues to the samples of fabric known as swatches. A digital swatch may be generally—but not necessarily—in the form of an image file, for example a JPEG file.

Clothing designers may demand a software produced visualisation of a fabric to be of high fidelity. It may not be generally feasible to faithfully capture and/or use the visual appearance of an entire bolt of the fabric. Consequently, the fabric information may generally be defined for an area less than that of a garment, defining what is known as a tile. Tiles generally may have a rectangular boundary, but may conceivably have another suitable boundary shape. A tile generally comprises at least one weave cell. The weave cell defines the fabric's weave pattern and can be tessellated to cover any defined area to digitally reproduce the weave over an area greater than that of the weave cell. Generally, but not necessarily, a tile comprises a plurality of weave cells, and may also define variations and/or patterns at scales greater than the weave cell (for example, tartan patterning, thread variations, weaving variations).

A tile generally has a surface area much less than that of a garment. Clothing design software generally may extrapolate the fabric information beyond the perimeter of a tile to produce a visualisation of the selected fabric fashioned into a garment. If the tile is suitably defined, the fabric information can be extrapolated beyond the perimeter of the tile by tessellating ("tiling") the tile and/or weave cell. It can be difficult, however, to generate an ideal tile and/or weave cell, in which case tessellation may create artifacts in the visualisation of the selected fabric, including repeated patterns not present in a bolt of the fabric. Artifacts in the visualisation of the fabric may occur because of one or more of, for example:

- the photographed sample of fabric has unacceptably large natural variations
- the photographed sample of fabric is creased, or rumpled
- the photographed sample of fabric is nonuniformly illuminated, and
- the photograph of the fabric has a configuration, size or orientation that results in pattern discontinuities at the boundaries of adjacent reproductions of the digital swatch.

Variations, creases, rumples, and nonuniform lighting, for example, are periodically reproduced by tessellation to form a pattern that may be visible. Pattern discontinuities and seams may be formed at tessellation boundaries. This is because periodic patterns of warp and weft threads-knotted knots—are unlikely to line up at tessellation boundaries. The artifacts can be visible and may be unacceptable.

It may be desirable to have a software produced visualisation of a selected fabric or garment free of visual artifacts. Photographing fabric with less natural variations, no creases and rumples, and using even illumination may help, however this requires significant human labour. A person can use their judgment to appropriately rotate, scale and stretch the digital swatch in software like Adobe Photoshop to reduce artifacts. Some software tools can assist with this process, for example Adobe Substance Designer, Unity Art Engine, Vizoo xTex, and PixPlant, however digital editing consumes many minutes of human labour per digital swatch. It may not be feasible to use human labour to produce a digital swatch for each of the vast number of new fabrics released every year, let alone the back catalogues.

Seams at tessellation boundaries may be particularly difficult to reduce to aesthetically acceptable levels. Generally, prior techniques to make seams imperceptible may require too much human labour to be deployed at scale and may not be entirely effective.

The applicants determined that using standard image processing techniques to overcome at least some of the above disclosed issues may be difficult, especially for complex fabrics—for example Dobby or Jacquard, in which a weave cell may comprise dozens of threads running in each of the waft and weft directions. Standard image processing techniques may generally neither suitable to calculate the average spacings in the warp and weft directions—which may be in part because of non-integer number of pixels—nor determining the variation in spacing of weave cells across the image—which may be caused by uneven fabric stretching. More than one periodic pattern—for example a weave and a print on the weave—may also be problematic. If fabric distortion is too large, or the weave cell size too large or too small, some signal processing features may be undetectable or non-existent. Signal processing features may be perturbed by image noise and crosstalk.

In the case where there is more than one periodic pattern in the fabric, such as a combination of a weave and a print, analysis of signal processing features may lead to results which are an undesirable combination of the two periodic patterns.

It may be desirable to:

- have a technique of removing or reducing artifacts—including seams—with less labour and/or at scale
- automate the removal or reduction in artifacts in software produced visualisations.

SUMMARY

Disclosed herein is a method for generating a digital fabric tile for a fabric. The method comprises, in a processor, determining a fundamental spatial frequency in an image of the fabric in each of two orthogonal directions. The method comprises, in the processor, determining a plurality of weave vectors for the image of the fabric. The method comprises, in a processor, forming the tile using the fundamental spatial frequency in each of the two orthogonal directions and the plurality of weave vectors.

An embodiment comprises receiving the image of the fabric.

An embodiment comprises using the plurality of weave vectors to determine a size for the digital fabric tile.

In an embodiment, the determined size of the digital fabric tile minimises a distortion.

An embodiment comprises transforming the plurality of weave vectors into a plurality of orthogonal weave vectors.

In an embodiment, transforming the plurality of weave vectors comprises at least one of summing and differencing the plurality of weave vectors.

In an embodiment, transforming the plurality of weave vectors into a plurality of orthogonal weave vectors comprises generating a plurality of candidate orthogonal weave vectors by at least one of summing and differencing integer multiples of a plurality of components of the plurality of weave vectors and selecting a candidate orthogonal weave vector of the plurality of candidate orthogonal weave vectors.

In an embodiment, the selected candidate orthogonal weave vector is that with the smallest magnitude and substantially perpendicular components.

An embodiment comprises aligning the plurality of weave vectors with a plurality of directions defined by the fabric.

In an embodiment, the plurality of directions defined by the fabric are defined by the fabric warp and the fabric weft.

An embodiment comprises applying a linear transformation.

An embodiment comprises determining the linear transformation.

An embodiment comprises applying a nonlinear transformation.

An embodiment comprises applying the nonlinear transformation aligns the image with a regular grid of weave cells.

An embodiment comprises determining the nonlinear transformation.

An embodiment comprises determining the nonlinear transformation comprises determining at least one harmonic spatial frequency present in the image of the fabric.

In an embodiment, determining the nonlinear transformation comprises using the at least one spatial harmonic spatial frequency present in the image of the fabric.

An embodiment comprises determining the at least one spatial harmonic frequency with sub pixel resolution.

In an embodiment, determining the at least one spatial harmonic frequency comprises the step of building a two-dimensional histogram using a weighting function to distribute displacements between Fourier intensity peaks within a neighbourhood of bins.

An embodiment comprises determining a weave cell for the image of the fabric.

An embodiment comprises determining a weave cell for the image of the fabric, wherein the weave cell is defined by at least one fundamental frequency of the at least one spatial harmonic frequency of the image of the fabric.

An embodiment comprises tessellating the weave cell.

An embodiment comprises the step of using the plurality of weave vectors to determine a suitable tile size.

An embodiment comprises discarding phase images that fail to meet a quality criterion before they are combined into a nonlinear transformation. The at least one phase image may be generated by demodulating the image of the fabric using the at least one harmonic spatial frequency.

Disclosed herein is non-transitory processor readable tangible media including program instructions which when executed by a processor causes the processor to perform a method disclosed above.

Disclosed herein is a computer program for instructing a processor, which when executed by the processor causes the processor to perform a method disclosed above.

Disclosed herein is a processor comprising the non-transitory processor readable tangible media disclosed above.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 1:
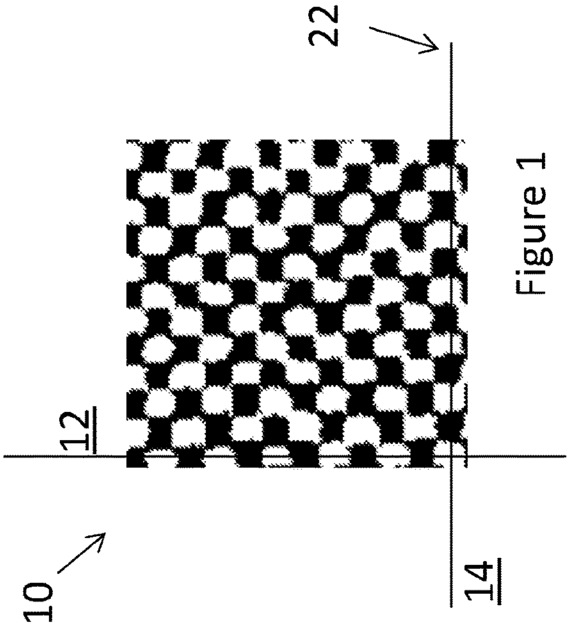
FIG. 1 shows an example of an image of a sample of fabric comprising a plurality of pixels arranged to an orthogonal grid.
Figure 2:
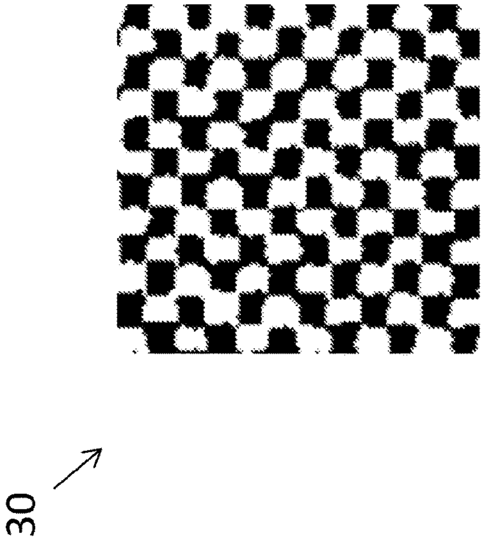
FIG. 2 shows a rectified image of the image of the sample of fabric of FIG. 1.

FIG. 1 shows an example of an image 10 of a sample of fabric comprising a plurality of pixels arranged to an orthogonal grid. The image 10 was generated by taking a photograph of the sample of fabric with a digital camera to create a digital image file, and may have been pre-processed. While the images are shown in black and white, the images can be in colour where suitable and desired. When the photograph was taken, the image plane was parallel to the fabric. As revealed by the image, the fabric comprises a plain weave that has a nominally vertical warp 12 and nominally horizontal weft 14 defined by orthogonal axes 22. FIG. 2 shows a rectified image of the sample of fabric 10, being generated by an example of a rectification processes that has been applied to the digital image file to generate a rectified digital image file.

Figure 3:
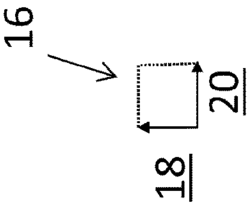
FIGS. 3 and 4 show weave vectors for the image of the sample of fabric in FIG. 1.

An example rectification process comprises, in a processor:

For an image 10 of a fabric, determining a weave cell 16 defined by orthogonal or nearly orthogonal vectors 18, 20 as shown in FIG. 3, where nearly orthogonal generally means a subtended angle of 87-93 degrees; and Aligning the vectors 18,20 of the weave cell 16 to the axes 22.

Figure 4:
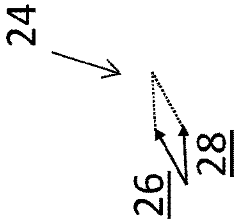

Another example of a rectification process comprises, in a processor:

For an image 10 of the fabric, determining a weave cell 24 defined by generally non-orthogonal vectors 26,28 as shown in FIG. 4;

Generating a transformed image 30 by distorting the image 10 of the fabric such that all weave cells are the same size and located on a regular grid, the regular grid being generally but not necessarily an orthogonal grid, whereby the warp and weft in the transformed image 30 have been straightened out.

The above disclosed examples of the rectification processes optionally comprises at least one of, in a processor:

Determining the rectangular weave cell 16 for the distorted image 10 that comprises weave vectors composed of summations of integer multiples of weave vectors.

Generating a transformed rectangular weave cell by applying a transformation in the form of a linear transformation to the rectangular weave cell 16

Cropping the transformed rectangular weave cell.

The above disclosed rectification process may generally generate a tile for tessellation.

Weave cell 16 with orthogonal vectors 18,20 represents a repeating block of pixels with similar appearance over the fabric. The weave cell 24 is the smallest weave cell for the image 30, and generally has a non-rectangular parallelogram shape with generally non-orthogonal vectors 26,28.

The applicant has determined how Fourier techniques can be executed in a processor to determine the smallest weave cell. The two fundamental spatial frequencies of the image of the weave define the two weave vectors for the smallest weave cell. Determination of the fundamental spatial frequencies of the image of the weave and the weave cell size, is now described. The Fourier techniques are defined by software comprising computer program instructions that when executed by the processor cause the processor to compute a discrete Fourier transform using a fast Fourier transform—for example the Cooley-Tukey algorithm, or using the FFTW library.

Figure 5:
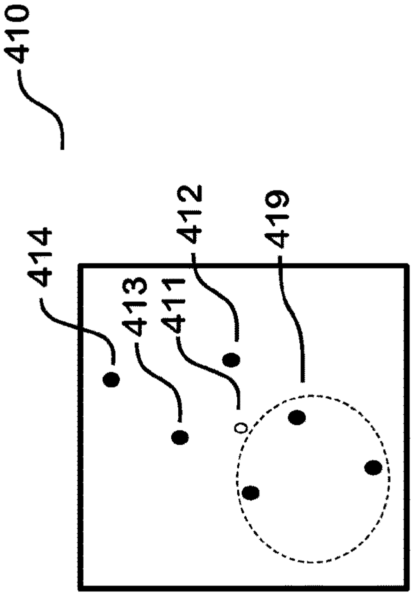
FIG. 5 shows a representation of a Fourier transform of the image of FIG. 1.

FIG. 5 shows a stylised representation of a Fourier transform 410 of the image 10. At the origin of the Fourier transform image is the DC value 411, which will have a value of zero in a flattened image. The peaks in encircled region 419 are symmetrical Hermitian copies of other peaks, and are disregarded. The two fundamental frequencies 412 and 413 are the two peaks closest to the origin.

Harmonics are present in the Fourier space corresponding to the image 10 having two orthogonal spatial frequency dimensions. In the Fourier space, harmonics are arranged on a grid, regularly spaced apart by the two fundamental spatial frequencies and centred on the origin. A harmonic frequency 414 has a position which is the vector sum of the positions of the two fundamental frequencies 412 and 413. Candidate fundamental spatial frequencies can be determined by:

forming a two-dimensional histogram of all of the displacements between all of the intensity peaks in the Fourier space and the origin.

determining the frequency coordinates of the intensity peaks in this two-dimensional histogram.

A two-dimensional histogram is a statistical measure of frequency of a two-dimensional statistical variable obtained by counting instances of that variable in a two-dimensional array of bins. Sub-pixel accuracy for the distances ("fractional distances") can be determined. The two-dimensional histogram can be constructed using fractional displacements to increment a neighbourhood of frequency bins using a weighting function, and estimating the sub-pixel position of the peaks in the histogram. The "neighbourhood" is defined by a rectangular array of pixels surrounding a specific central pixel, for example a 3×3 neighbourhood centred on a pixel.

To increase accuracy when determining locally maximum values in a histogram, the count is generally but not necessarily distributed around a neighbourhood of the central bin using a weighting function.

Figure 6:
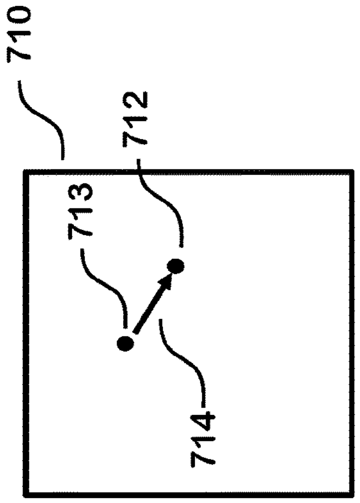
FIGS. 6 and 7 illustrate a described process for determining peaks in a histogram.
Figure 7:
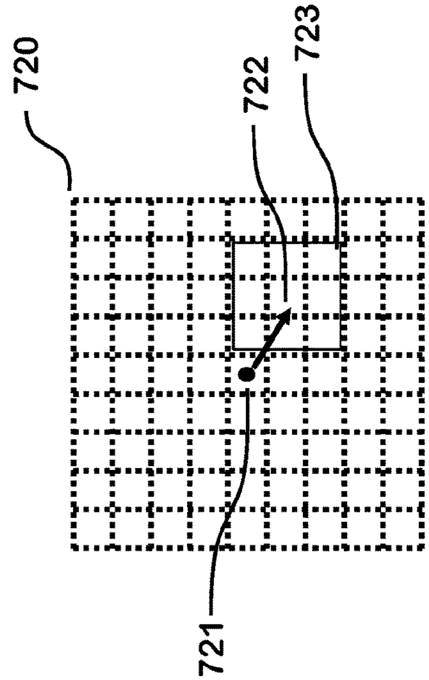

This process is illustrated in FIGS. 6 and 7. In FIG. 6, Fourier transform 710 has two intensity peaks shown, 712 and 713. The displacement vector between the first peak 712 and the second peak 713 is shown 714, and for illustrative purposes it has the value (1.6,1.1), where a positive x displacement points to the right, and a positive y displacement points downwards.

In FIG. 7, two dimensional histogram 720 is shown in the process of its construction. It has dimensions of 9×9, representing displacements ranging between (−4,−4) and (+4,+4) inclusive. The origin of this histogram 710 represents a displacement of (0,0).

To incorporate the displacement 714 (which is the same as 722) into the histogram without weighting, the closest bin to the displacement vector 722, i.e. (2,1), would be incremented.

To incorporate the displacement 714 into the histogram with a weighting, a 3×3 neighbourhood of bins 723 of the closest bin 722, would be incremented with weight determined by the weighting function.

The weighting function is calculated in a separable manner, i.e. the weights for the x and y coordinates are calculated independently using the weighting function and the final weight is the product of the x and the y weights.

For an arbitrary pixel (x, y), the x−weights (wx0, wx1, wx2) are calculated for pixel (round(x)−1, round(x), and round(x)+1), and the y−weights (wy0, wy1, wy2) for pixel (round(y)−1, round(y), round(y))+1, where round(x)=floor (x+0.5).

The weighting values (wx0, wy1, wy2) can be calculated using a raised cosine, although many other functions could be used with similar efficacy:

$$wx0 = \frac{1 + \cos\left(\frac{2\pi}{3}((x+1) - \mathrm{round}(x))\right)}{3}$$

$$wx1 = \frac{1 + \cos\left(\frac{2\pi}{3}(x - \mathrm{round}(x))\right)}{3}$$

$$wx2 = \frac{1 + \cos\left(\frac{2\pi}{3}((x-1) - \mathrm{round}(x))\right)}{3}$$

The weighting values (wy0, wy1, wy2) are calculated in a similar manner.

Constructing the two-dimensional histogram in this manner enables the position of the peaks in the histogram to be estimated with sub-pixel accuracy. Up to 100 displacement intensity peaks, say, are chosen. The chosen peaks generally are the peaks with the largest magnitude, and each peak has a magnitude that is 15 times greater, say, than the mean magnitude of the flattened Fourier transform. Non-maximum suppression is used to remove peaks closer than 20 pixels away, say, from a larger peak. Non-maximum suppression is a technique that ensures that when obtaining a set of maximum values in an image or signal, none of the values are too close to each other.

Flattening of the Fourier spectrum is achieved by calculating a real and positive Fourier intensity spectrum image, that is, the magnitude squared of the complex values, low-pass filtering the intensity image, for example using a Gaussian kernel of width 100 pixels, then dividing the original transform by the filtered intensity image. This flattening operation has the effect of normalizing peak height by the local energy spectrum.

To find the fundamental frequency for each of the two frequency dimensions, a search of all possible peak pairs from the set of selected peaks in the histogram is made to determine the pair that is consistent with the largest count of intensity peaks in the Fourier space. If more than one peak pair has the same count, the pair closest to the origin is taken. A peak pair is determined to be harmonically consistent with a Fourier intensity peak if the coordinates of the Fourier intensity peak is within 0.1 pixels, say, of an integer combination of the coordinates of the distance intensity peaks comprising the peak pair. The peak pair which is consistent with the most Fourier intensity peaks and closest to the origin is determined to be the two fundamental frequencies. The set of Fourier intensity peaks consistent with this peak pair are selected for further analysis.

This technique for finding the pair of fundamental frequencies may be more robust than direct analysis of intensity peaks. Because the two fundamental frequencies are determined by a combination of multiple Fourier peaks, their positions may be estimated with improved accuracy.

By constructing the histogram using fractional displacements to increment a neighbourhood of bins using a weighting function, and by estimating the sub-pixel position of the displacement intensity peaks, the peaks in the displacement histogram can be estimated with better than one-pixel accuracy. As with the intensity peaks of the Fourier transform, up to 100 displacement intensity peaks with the largest magnitude are chosen if their magnitude is 15 times larger than the mean magnitude of the flattened Fourier transform, with non-maximum suppression used to remove peaks closer than 20 pixels away from a larger peak.

In the case where there are two independent periodic patterns in the fabric, this technique is likely to select the fundamental frequencies and harmonics corresponding to only one of the two independent patterns. The intensity peaks which are not harmonics of the fundamental frequencies are generally disregarded. Because the two fundamental frequencies are determined by a combination of multiple Fourier peaks, their positions are generally estimated with a higher degree of accuracy.

The two fundamental weave frequencies define the two original weave vectors and hence the original weave cell. A weave cell may be determined for the image of the fabric, wherein the weave cell is defined by at least one fundamental frequency of the at least one spatial harmonic frequency of the image of the fabric.

Given a weave frequency f=(u, v), where u, v represent cycles per image width and height respectively, and a Fourier transform of the image 10 of dimensions (U, V) and (X, Y) respectively, where U=X and V=Y, the weave period of that frequency w=(x, y) in pixels is determined using the following equation:

$$\text{let } k = \frac{u^2}{U^2} + \frac{v^2}{V^2}$$

$$x = u/kU$$

$$y = v/\text{kV}$$

Note that the Fourier transform image has its origin in the centre of the image at position (u, v)=(0, 0), with allowable values of u varying between −(floor(U/2), U−floor(U/2)) and allowable values of v varying between −(floor(V/2), (V−floor(V/2)).

That is, the horizontal weave period x is the ratio of the horizontal weave frequency u to the horizontal Fourier transform dimension U (horizontal ratio), and the vertical weave period y is the ratio of the vertical weave frequency v to the Fourier transform vertical dimension V (vertical ratio), both values being further divided by a normalising factor k. The normalising factor k is the sum of the squares of the horizontal ratio and the vertical ratio.

The weave period gives the minimum spacing between two neighbouring crests of the weave frequency, and is in a direction orthogonal to the lines representing the crests.

Where the fundamental frequencies $f_1=(u_1, v_1)$ and $f_2=(u_2, v_2)$ are orthogonal to each other, the weave vectors correspond directly to the weave periods. However, in the general case where the weave cells 24 are parallelograms and not rectangular, the weave periods and the weave vectors 24, 28 are not the same. In this case, the weave periods do not give the weave vectors directly, because the weave cell repeats at locations where the number of period repeats is an integer, which only occurs at the intersection points of crest lines of the two weave frequencies.

From the two weave periods $w_1=(x_1, y_1)$, $w_2=(x_2, y_2)$ of the fundamental frequencies $f_1=(u_1, v_1)$, $f_2=(u_2, v_2)$, the original weave vectors $s_1=(p_1, q_1)$, $s_2=(p_2, q_2)$ can be calculated from where the period lines intersect, by inverting and post-multiplying a 2×2 matrix formed from the weave period components by the weave period corresponding to the weave vector:

$$\begin{pmatrix} p_1 \\ q_1 \end{pmatrix} = \begin{pmatrix} y_1 & -y_2 \\ -x_1 & x_2 \end{pmatrix}^{-1} \begin{pmatrix} x_1 \\ y_1 \end{pmatrix}$$

$$\begin{pmatrix} p_2 \\ q_2 \end{pmatrix} = \begin{pmatrix} y_2 & -y_1 \\ -x_2 & x_1 \end{pmatrix}^{-1} \begin{pmatrix} x_2 \\ y_2 \end{pmatrix}$$

Having determined two fundamental frequencies which describe the original weave vectors, and their associated set of harmonics, these can now be used to determine the distortion in the form of a non-linear distortion of the image 10 as a nonlinear transform.

A nonlinear transform is a mapping that transforms any coordinate from the image 10 to its corresponding coordinate in the rectified image 30. One common representation of a nonlinear transform is as an array of two dimensional coordinates, in which each array cell maps a corresponding pixel of image 10 at coordinate (x, y) to coordinate (x', y').

The nonlinear distortion of an image with strong intensity peaks in the Fourier domain can be determined using phase-estimation distortion analysis ("PEDA") disclosed by Australian patent publication AU2009202141A1 (Hardy and Fletcher) and incorporated herein by way of reference.

The determined harmonics of image 10 of the fabric can be used with the PEDA technique to determine the nonlinear distortion of the image 10. The harmonics represent the carrier frequencies used in the PEDA technique.

In the PEDA technique, each carrier frequency is demodulated, shifted to base band and unwrapped. An unwrapped phase value of zero cycles represents a zero distortion (where a cycle is 2π radians). Any nonzero value at a particular position represents a proportional distortion in units of the weave period corresponding to a carrier frequency. For example, if a weave period for a specific carrier frequency is (10,0) pixels, and the unwrapped phase at a position is 2 cycles, then the distortion at that position is (20,0) pixels. Generally, but not necessarily, each unwrapped phase value is noisy and gives distortion information only in one direction, so to calculate a robust distortion estimate at each image position a conventional linear system is created to describe the multiple distortion estimates from all carriers, then a least-squares solver, weighted by carrier amplitude, is used to solve for image distortion. To convert from a distortion estimate to a nonlinear transform, the identity transform, i.e. (x, y)→(x, y), is added to each distortion estimate to form a distortion map.

Some modifications to the PEDA method are generally required for this application. Firstly, PEDA relies upon the existence of a reference image, but in this application no such reference image exists. Instead, the PEDA method is generally but not necessarily used directly using the determined fundamental frequencies and harmonics as carrier frequencies for analysis. Secondly, accommodations are generally but not necessarily made to deal with determined carrier frequencies which do not produce useful phase images due to image noise and crosstalk. Thirdly, as the expected phase offset of determined carrier frequencies is unknown, the phase value of each demodulated image is generally but not necessarily set to zero at the origin by subtracting the original phase value at the origin from the image, resulting in a zero displacement estimate from each demodulated image at the origin.

The PEDA method generally does not require peaks to be in a harmonic relationship to detect nonlinear distortion, however it is preferable that this harmonic relationship is present. This is because, in the case of two independent periodic patterns in the image 10—for example a weave and a print—it is unlikely that the two patterns synchronize together to exactly form a periodic signal. There can also be independent nonlinear distortions associated with each pattern. The nonlinear distortion detected using a combination of the harmonics from two independent patterns will contain some combination of the distortions present in both patterns, and these distortions will be highly unlikely to correspond exactly to either. Therefore, only the intensity peaks which are harmonics of the fundamental frequencies should be used in the determination of nonlinear distortion.

In the applicant's experience, the number of detected harmonics in an image of a fabric are most commonly between 8 and 32, however the number of detected harmonics may be outside of this range, for example two and several hundred. When each harmonic and/or carrier frequency is demodulated to form a phase image, however, the phase images arising from some harmonics are of poorer quality than others because of image noise and crosstalk from unrelated carrier frequencies. Using poor-quality phase images will generally result in an inaccurate determined distortion. To improve the final determined distortion, poor-quality phase images can be discarded before they are combined into a nonlinear transform. An effective technique for discarding poor-quality phase images is, firstly, to sort the unwrapped phase images into ascending order of the number of phase residues, to discard all phase-unwrapped images containing more than, say, 100 phase residues, and, if there are more than eight remaining phase images, discarding all phase images after the first eight which contain, say, 50 or more phase residues.

If fewer than two phase images remain, the measurement of nonlinear distortion has failed, and the technique cannot proceed. This outcome generally signifies an image of a fabric from which a tile can't be formed. If two or more images remain, then a nonlinear transform representing the nonlinear distortion of the digital swatch from a registered weave pattern is generated from the digital swatch image and the detected harmonics.

Figure 8:
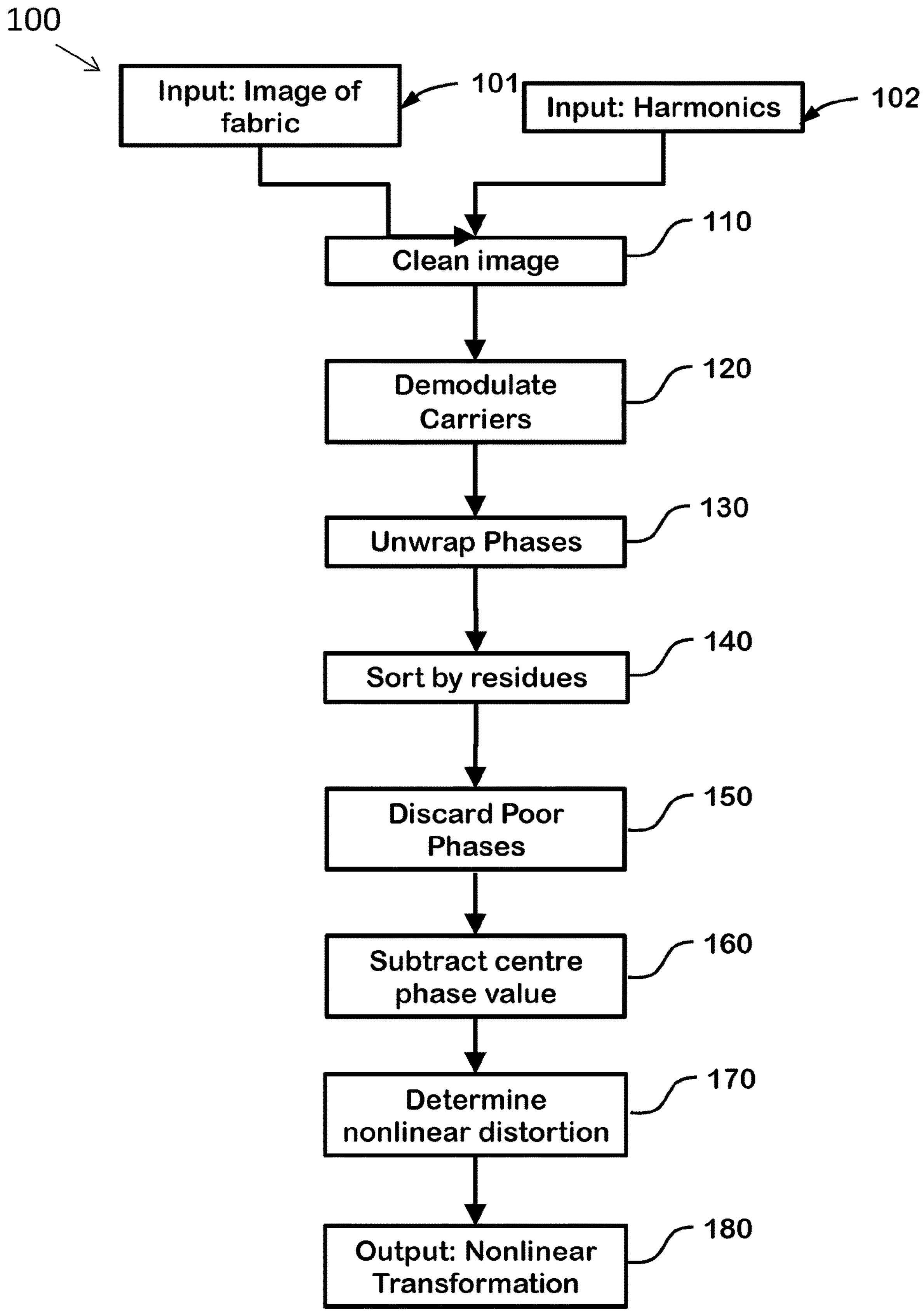
FIG. 8 is a flow diagram showing steps of an example of a process for determination of a nonlinear distortion in the image of FIG. 1.

FIG. 8 is a flow diagram showing steps of an example of a process 100 for determination of a nonlinear distortion according to the PEDA technique. The inputs to the process include an image of a fabric 101 and harmonics frequencies 102. In step 110, the image is cleaned to produce a clean Fourier transform by removing the mean value and windowing the edges. In step 120, the image processed by step 110 is demodulated with the set of carrier frequencies, which results in a set of low-frequency images containing complex pixels. In a step 130, the set of low-frequency images is unwrapped, resulting in a set of triples consisting of amplitude images, unwrapped phase images, and a count of phase residues. In a step 140, the set of amplitude and unwrapped phase pairs are sorted into increasing order of detected residues. In a step 150, all pairs containing, say, 100 or more residues are discarded, and all pairs after the first eight containing more than, say, 50 residues are discarded. Unlike the reference pattern used for the PEDA method, the phase relationship between harmonics in a fabric swatch image is arbitrary and unknown, so in step 160 the unwrapped phase value at the origin of each unwrapped phase image is subtracted from the processed image, so that all unwrapped phase images contain a value of 0 at the origin, representing a zero shift at the image origin. If all unwrapped phase images have a value of zero at a particular position, then the nonlinear distortion is also zero, representing an undistorted swatch at that position. As the unwrapped phase is set to zero at the origin, the distortion at the origin is also zero.

In step 170, the set of amplitude and unwrapped phase images are combined to generate the nonlinear distortion 170. In step 180, the nonlinear transform is outputted.

The nonlinear transform can be used directly with a forward image-warping algorithm to create a rectified image 30 from the original image 10. The rectified image 30 has straight warp and weft lines, and can be used directly in digital imagery. The rectified image 30, however, cannot generally be used directly to form a tile that tessellates without noticeable seams at tile borders. This is because (1) the warp and weft lines are in general not horizontal nor vertical, and (2) the warp and weft spacing will not fit exactly within an integer number of pixels. Further processing is required to form a suitable tile.

To form a suitable tile, further analysis of the original weave vectors is generally necessary.

Although the original weave vector pair correctly describe the repetitive structure of the image 10 of the fabric, weave vectors are generally not unique for a given fabric. The original weave vector pair does not necessarily describe the smallest and/or a rectangular weave cell. The original weave vector pair generally will not align with the axes. By forming integer multiples of weave cell vectors a regular grid of intersection points is formed, and any two points non-colinear with the origin represent another consistent pair of weave vectors. The weave cell corresponding to this new pair might combine several weave cells of the original size.

Integer sums and differences of the original weave vectors are combined to create a pair of weave vectors that (1) is close to orthogonal, (2) better represents the warp and weft structure of the fabric, and (3) is consistent with the original weave vectors.

One technique for determining improved weave vectors includes a brute-force search. The search is restricted to a square bounding box with sides three times the maximum of the width and height of the original weave vectors; all sums and differences of integer multiples of the weave vectors are created which fit within said bounding box; the shortest weave cell spacing which forms an angle of 3 degrees or less to either axis is taken as the first improved weave vector, and if such a weave vector does not exist, then the weave vector with the closest angle to either axis is taken as the first improved weave vector; the shortest weave vector which is within, say, 0.5 degrees of an orthogonal to the first improved weave vector is taken as the second improved weave vector, and if such a weave vector does not exist, the weave vector closest to being orthogonal to the first is taken. Angles other than 0.5 degrees may be selected, for example 2 degrees, 1 degree, 0.25 degrees and 0.1 degrees as desired and appropriate.

For simplicity and without loss of generality, we shall assume that the first improved weave vector points along the positive x axis, i.e. $|p_1|>|q_1|$ and $p_1>0$, and the second weave vector points along the positive y axis, i.e. $|p_2|<|q_2|$ and $q_2>0$.

By the process described above, a pair of weave vectors is created which match the spacing of weave cells in the rectified image 30 and point approximately along the two axes 12,14. The improved weave vectors, however, are generally not suitable to form a tile that provides a seamless tessellation, because (1) the weave vectors are generally not aligned with either axis 12,14, resulting in a warp and weft inclined with respect to the axes 12,14, and (2) the weave vectors contain arbitrary fractional parts which are unlikely to form an integer number of pixels when placed in a regular grid, resulting in a tile which has a perceptible seam at the edges.

Modified weave vectors are created which resolve (1) and (2), and from which an appropriate tile size and linear transformation formed for seamless tessellation.

The modified weave vectors are only approximately aligned with the axes 12,14. To more precisely align the weave vectors with the axes 12,14, oriented weave vectors are created by rotating both improved weave vectors by the same angle to align the most vertical or horizontal vector with the x or y axis, then respectively setting the x or y part of the other rotated improved weave vector to zero, resulting in oriented weave vectors of the form (p, 0), (0, q). The length of the oriented weave vectors is then modified slightly to make each a rational number in length which fits exactly into one dimension of a tile, to form final weave vectors.

A tile width and height that reduces distortion is chosen. A process to determine an appropriate tile width is now described. Input into this process is the first oriented weave vector (p, 0) and a range of allowable integer tile widths specified as two integers, with the first being the preferred tile width, and the second being an allowable bound on the tile width, being either greater or lesser than the first. Each prospective width between the first and second tile widths inclusive is tested to form a replacement weave vector to approximate the current weave vector, and the absolute difference taken between the two vector lengths to form an error. The first replacement vector with an error smaller than 0.01 pixels is taken as the final weave vector, and if no replacement vector has a small enough error, the replacement vector with the minimum error is taken as the final weave vector. The error e for a prospective width w is calculated by finding the whole number of repeats c that can be made of the length of the first weave vector p which is closest to the prospective width, then taking the difference between the first weave vector length, and the prospective width divided by the whole number of repeats:

$$\text{Let } c = \text{round}\left(\frac{w}{p}\right)$$

$$e = \left|\frac{w}{c} - p\right|$$

Using the same method, the tile height h and second final weave vector is computed from the second oriented weave vector (0, q) and a range of allowable tile heights.

The two improved weave vectors give the weave cell spacing in the rectified image. To be able to form a seamless tile, the rectified image must be distorted to slightly modify the weave cell spacing from the improved weave cell vectors to the spacing of the final two weave vectors. This distortion is the linear transformation representing a change of basis from the two improved weave vectors to the two final weave vectors.

Using a suitable image warping algorithm, the rectified image can be warped using the linear transformation to form a tile. Cropping any window of size (w, h) from this image will yield a seamless tile. The position of the crop window may be shifted to avoid undesirable defects in the cloth swatch or processing artifacts close to the edges of the image.

To reduce processing time and increase image quality, the nonlinear transformation determined by the PEDA technique and the linear transformation can be composed to form a transformation which can be used to warp the original digital swatch directly to form a tile. If an inverse warping algorithm is used, which may be faster and simpler to implement than a forward warp, the inverse composite transformation can be used to generate the tile, and can also be combined with the cropping operation so only the pixels within the tile need be generated.

Digital optical images can be captured using at least one digital camera. For example, a camera with a 30-megapixel sensor, an 85 mm lens, a Xenon flash unit, ISO set to 100 and exposure set to 1/200 second can produce suitable images for producing high-quality images of a sample of fabric. A Canon EOS R or other mirrorless or DSLR camera may be used. However, a camera with lesser specifications, such as on an iPhone 12 or other smart device, can also be used with a commensurate drop in quality. Alternatively, a film camera may be used and the developed photographs digitally scanned to generate digital optical images.

The digital optical images can be sent to the processor in the form of a digital electronic device, for example a computer server connected to the internet, or general purpose computer system, or within an embedded system. An example processor comprises a logic device such as, or similar to, an Intel Core microprocessor or a suitably configured field programmable gate array (FPGA), connected over a bus to a random-access memory of around 64 GB and a non-volatile memory such as a hard disk drive or solid-state non-volatile memory having a capacity of around 1 TB. The processor has a receiver such as a USB port (or computer network interface, for example) for receiving information, stored on a USB FLASH device, for example. The program may have been installed onto the processor from tangible media such as a DVD or USB memory stick, for example, that stored the program. Generally, any suitable processor may be used.

In the non-volatile memory is stored a computer program for instructing the processor. The computer program, when executed by the processor, causes the processor to process the digital image information. The computer program can take generally any suitable form, the source code can and be written in any programming language (examples of which include but are not limited to Python, C #, C, C++, GO, R, and Swift) and compiled to form suitable object code for an executable file. The processor executing the software processes the digital optical images when received.

Now that embodiments have been described, it will be appreciated that some embodiments may have at least some of the following advantages:

Tiles may be generated that when tessellated produces a visualisation of a fabric with ameliorated artifacts.

Less labour may be required.

Costs may be reduced.

Tiles may be generated for a complex fabric, for example Dobby or Jacquard.

Tiles may be generated for a woven fabric with a print thereon.

Fractional pixels may be manageable.

Issues associated with at least one of unacceptably large variations in a fabric, creases, rumples, and nonuniform illumination may be overcome.

Discontinuities at tile boundaries because of image configuration, size or orientation may be overcome.

Variations and/or modifications may be made to the embodiments described without departing from the spirit or ambit of the invention. For example:

Generally, any suitable alternative to phase-estimation distortion analysis may be used.

Any suitable Fourier transform algorithm may be used.

The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method for generating a digital fabric tile for a fabric, the method comprising:

in a processor, determining a fundamental spatial frequency in an image of the fabric in each of two orthogonal directions;

in the processor, determining a plurality of non-orthogonal weave vectors for the image of the fabric;

determining the fundamental spatial frequency in each of the two orthogonal directions by rotating the plurality of non-orthogonal weave vectors and changing at least one element of the plurality of non-orthogonal weave vectors to zero; and forming the digital fabric tile, the digital fabric tile being seamless and having an integer pixel width and an integer pixel height, using the fundamental spatial frequency in each of the two orthogonal directions and the plurality of weave vectors.

2. The method defined by claim 1, comprising receiving the image of the fabric.

3. The method defined by claim 1, comprising using the plurality of weave vectors to determine a size for the digital fabric tile.

4. The method defined by claim 3, wherein the determined size of the digital fabric tile minimizes a distortion therein.

5. The method defined by claim 1, comprising transforming the plurality of weave vectors into a plurality of orthogonal weave vectors.

6. The method defined by claim 5, wherein transforming the plurality of weave vectors comprises at least one of summing and differencing the plurality of weave vectors.

7. The method defined by claim 5, wherein transforming the plurality of weave vectors into a plurality of orthogonal weave vectors comprises generating a plurality of candidate orthogonal weave vectors by at least one of summing and differencing integer multiples of a plurality of components of the plurality of weave vectors and selecting a candidate orthogonal weave vector of the plurality of candidate orthogonal weave vectors.

8. The method defined by claim 7, wherein the selected candidate orthogonal weave vector is that with the smallest magnitude and substantially perpendicular components.

9. The method defined by claim 1, comprising aligning the plurality of weave vectors with a plurality of directions defined by the fabric.

10. The method defined by claim 9, wherein the plurality of directions defined by the fabric are defined by the fabric warp and the fabric weft.

11. The method defined by claim 10, comprising determining a linear transformation and applying the linear transformation to the image.

12. The method defined by claim 1, comprising determining a nonlinear transformation and applying the nonlinear transformation to the image, wherein applying the nonlinear transformation aligns the image with a regular grid of weave cells.

13. The method defined by claim 12, wherein determining the nonlinear transformation comprises determining at least one harmonic spatial frequency present in the image of the fabric, and using the at least one spatial harmonic spatial frequency present in the image of the fabric.

14. The method defined by claim 13, wherein determining the at least one spatial harmonic frequency comprises the step of building a two-dimensional histogram using a weighting function to distribute displacements between Fourier intensity peaks within a neighborhood of bins.

15. The method defined by claim 1, comprising determining a weave cell for the image of the fabric and comprising tessellating the weave cell.

16. The method defined by claim 14, comprising determining a weave cell for the image of the fabric, wherein the weave cell is defined by at least one fundamental frequency of the at least one spatial harmonic frequency of the image of the fabric and comprising tessellating the weave cell.

17. The method defined by claim 1, comprising the step of using the plurality of weave vectors to determine a suitable tile size and comprising discarding phase images that fail to meet a quality criterion before they are combined into the nonlinear transformation.

18. The method defined by claim 17, wherein at least one phase image is generated by demodulating the image of the fabric using the at least one harmonic spatial frequency.

19. A non-transitory processor-readable tangible media including program instructions which when executed by a processor causes the processor to perform the method of claim 1.

20. A computer program for instructing a processor, which when executed by the processor causes the processor to perform the method of claim 1.

21. A processor comprising the non-transitory processor-readable tangible media defined by claim 19.

* * * * *